United States Patent [19]

Pettis, Jr. et al.

[11] 3,955,665
[45] May 11, 1976

[54] AUTOMATIC WEIGHING AND LABELING MACHINE

[75] Inventors: Charles R. Pettis, Jr.; Victor Del Rosso, both of Ithaca, N.Y.

[73] Assignee: Hi-Speed Checkweigher Co., Inc., Ithaca, N.Y.

[22] Filed: Dec. 26, 1974

[21] Appl. No.: 536,301

[52] U.S. Cl. .................................. 198/39; 198/110
[51] Int. Cl.² ....................................... G01G 13/30
[58] Field of Search .................... 198/19, 39, 110; 177/16, 145

[56] References Cited
UNITED STATES PATENTS

| | | | |
|---|---|---|---|
| 3,394,792 | 7/1968 | Arvidson et al. | 198/39 |
| 3,545,588 | 12/1970 | Corley | 198/39 |
| 3,596,750 | 8/1971 | Hendon et al. | 198/39 |
| 3,834,520 | 9/1974 | Patin | 198/110 |

*Primary Examiner*—Robert B. Reeves
*Assistant Examiner*—Larry H. Martin
*Attorney, Agent, or Firm*—Bean & Bean

[57] ABSTRACT

A continuously driven endless belt type conveyor is disclosed as being employed to transfer packages successively through a weighing station having a weighing platform on which packages rest during weighing thereof and a package labeling station. A flight of the conveyor passing through the weighing station is adapted to be lowered and raised for the purpose of removably placing a package in resting engagement with the weighing platform, while concurrently having its speed of travel relative to the platform varied to effect deceleration of the package prior to weighing and acceleration of the weighed package prior to discharge.

9 Claims, 7 Drawing Figures

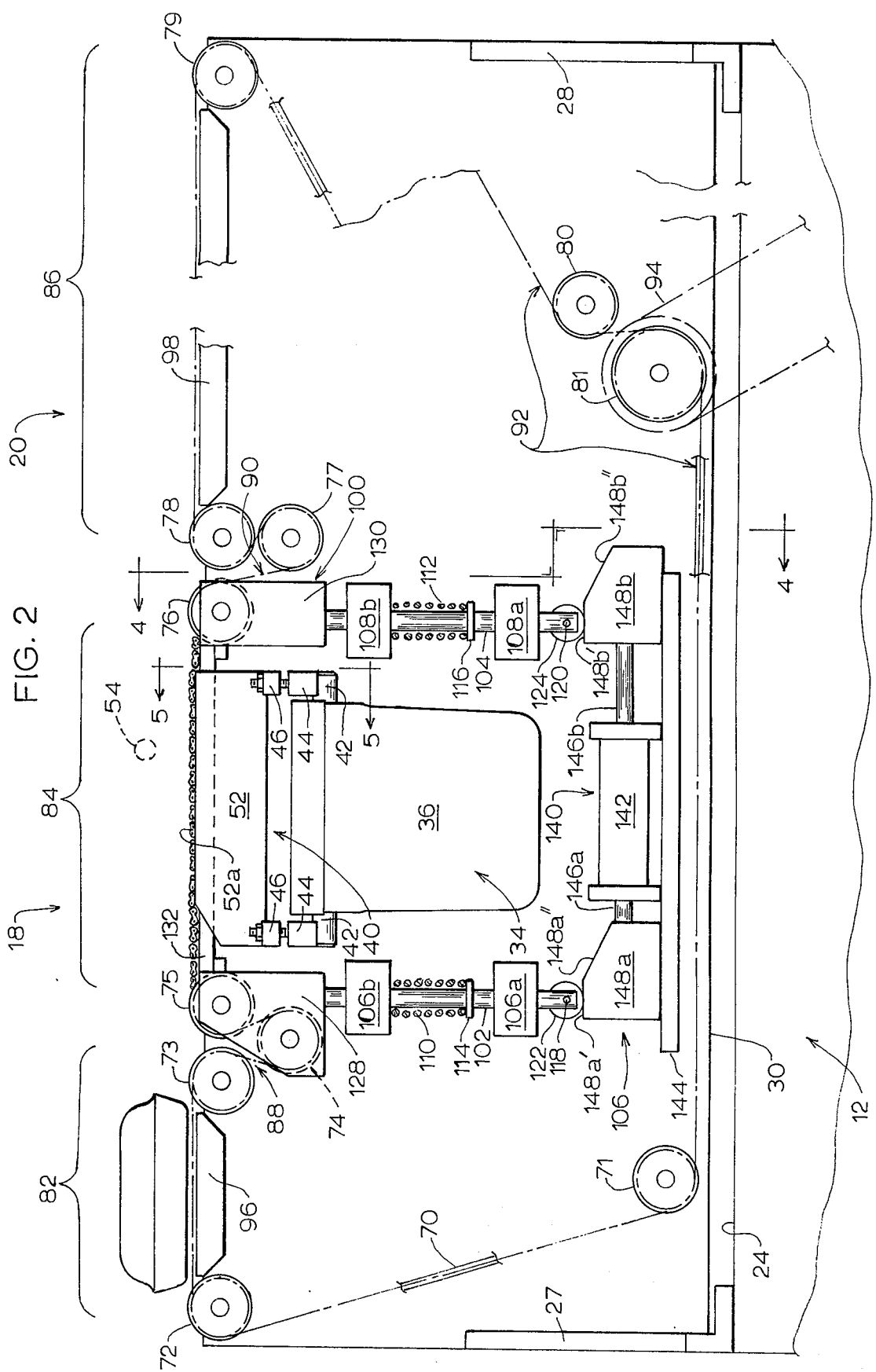

AUTOMATIC WEIGHING AND LABELING MACHINE

BACKGROUND OF THE INVENTION

The present invention generally relates to an improved conveying system, which may be employed for moving packages through a station at which a package is weighed followed by a station at which a label bearing package weight/price indicia is applied to the weighed package.

A problem inherent in weighing-labeling machines is the necessity of first moving a package to be weighed from the conveyor to a weigher and then returning such package to the conveyor without interrupting conveyor movement or adversely influencing operation of the weigher or increasing the period of time required by the weigher to perform a weighing operation. Opposite approaches to this problem are disclosed for instance by U.S. Pat. Nos. 2,597,069 and 3,394,792.

In U.S. Pat. No. 2,597,069 transfer of packages from a conveyor to a weigher and from the weigher to the conveyor is achieved by projecting elements of the weigher upwardly between transversely spaced elements of a continuous belt type conveyor whereby to lift the package from the conveyor; the weigher elements being subsequently retracted at the completion of the weighing operation in order to re-position the weighed package on the conveyor for discharge from the weighing station. A serious drawback of this type of machine is that the required vertical displacement of the weigher produces substantial vibrations, which must of course be dampened before the weighing operation can proceed. As a result only a relatively low speed weighing and labeling operation can be achieved with this type of machine.

An increase in speed of the weighing operation may be theoretically achieved by employing a machine of the type disclosed in U.S. Pat. No. 3,394,792, which features an arrangement wherein a portion of a conveyor passing through a weighing station is lowered and raised relative to a weighing platform such that vertical deflections or movement of the platform are essentially limited to those induced by the weight of the package. However, the operational speed of this type of machine is limited by the requirement that the conveyor cannot be driven at a speed above that at which an article when placed upon the weighing platform will slide off such platform or be incorrectly positioned thereon. Moreover, as the speed of the conveyor and thus the package is increased, the tendency of the weighing platform to be subjected to tilting vibrations increases. Since these vibrations must also be dampened to avoid inaccuracies in the weighing operation, a definite limit is placed on permissible speed of the conveyor.

SUMMARY OF THE INVENTION

The present invention is primarily directed towards an improved package conveying arrangement, which is particularly adapted to provide an overall increase in the operational speed of package weighing and labeling machines of the general type described above.

In accordance with a preferred form of the present invention, a conveyor is formed from a plurality of transversely spaced, endless belt elements, which are trained about a plurality of guide or idler rollers to define an intermediate conveyor belt flight end connected by non-supporting inlet and outlet belt loop portions to infeed and outfeed conveyor belt flights, respectively. The intermediate flight extends through the weighing station and is normally arranged in a package receiving-discharge position above a relatively stationary weighing platform for receiving a package to be weighed from the infeed flight and for discharging a weighed package from the weighing station onto the outfeed flight. A remotely disposed motor drive is employed to drive the belt elements at an essentially constant, given package transport speed.

Certain of the guide rollers adjacent opposite ends of the intermediate flight are fixed to a frame having vertical reciprocating movements controlled by a piston-cam arrangement, whose operation is in turn controlled by signals from an electric eye responsive to the presence of a package to be weighed on the intermediate flight and to a signal indicating completion of a weighing operation. The presence of a package to be weighed on the intermediate flight initiates lowering of the frame associated guide rollers and thus the intermediate flight in order to place the package to be weighed in resting engagement with the weighing platform, while concurrently shortening and lengthening the outfeed and infeed belt portions, respectively. Thus, although the intermediate flight, as an integral part of the overall belt conveyor is still driven, its speed relative to the weighing platform is in effect decreased with the result that the package to be weighed is decelerated before it is placed in resting engagement with the weighing platform. When the intermediate flight is returned to its normal package receiving-discharge position for the purpose of first removing the weighed package from the weighing platform and then effecting discharge thereof onto the outfeed flight, the outfeed and infeed belt loops are concurrently lengthened and shortened, respectively. As a result, the intermediate flight is caused to accelerate or travel at a speed relative to the weighing platform, which is in excess of the given package transport speed.

By employing the intermediate flight to decelerate the package to be weighed before it is placed in engagement with the weighing platform, the speed at which packages are presented to the weighing station may be substantially increased without subjecting the weighing platform to a corresponding time consuming increase in vibrational influences or causing misplacement or misalignment of the package on the weighing platform. On the other hand, by causing the intermediate flight to travel at a higher rate of speed than the overall conveyor speed, as the intermediate flight is returned to its normal position, inertia of the weighed package may be more easily overcome and it is presented for discharge onto the outfeed flight within a shorter period of time than heretofore possible. As a result, the overall operational speed of the machine may be substantially increased. Moreover, the overall conveyor system of the present invention is greatly simplified, since a single remotely placed motor may be employed simultaneously to drive all flights of the system. Also, the high operational speed of the machine permits it to be fed continuously from a source comprising a lower speed line of engaged end-to-end packages and automatically to achieve required spacing between packages for passage through the weighing station, thereby negating the need to provide escapements or releases to control or permit intermittent release of packages from the source.

While for the purpose of reference, the conveying system of the present invention is herein described with particular reference to its being used in conjunction with a weighing and labeling machine, it is considered as possessing more general utility in the field of high speed material handling. Specifically, its use is contemplated in checkweigher apparatus, which would include a package filling mechanism arranged above a weighing platform. Of course, the present conveying system would also possess utility in diverse material handling environments in which a weighing operation is not involved. As by way of specific example, the present conveying system may be used wherever it is desired to bring a conveyed object to rest on a suitable platform in order to enable some processing step to be performed, including for instance inspection, testing treatment and part assembly. With reference to this latter example, it will be appreciated that it would be practical to provide a plurality of assembling stations or both assembling and inspection stations located at spaced points along a common supporting run of the conveyor system, since the raising and lowering of the conveyor at any of the stations would not influence conveyor speed at adjacent stations.

DRAWINGS

The nature and mode of operation of the present invention will now be more fully described in the following detailed description taken with the accompanying drawings wherein:

FIG. 2 is a sectional view taken generally along the line 2—2 in FIG. 1;

DETAILED DESCRIPTION

Figure 1:
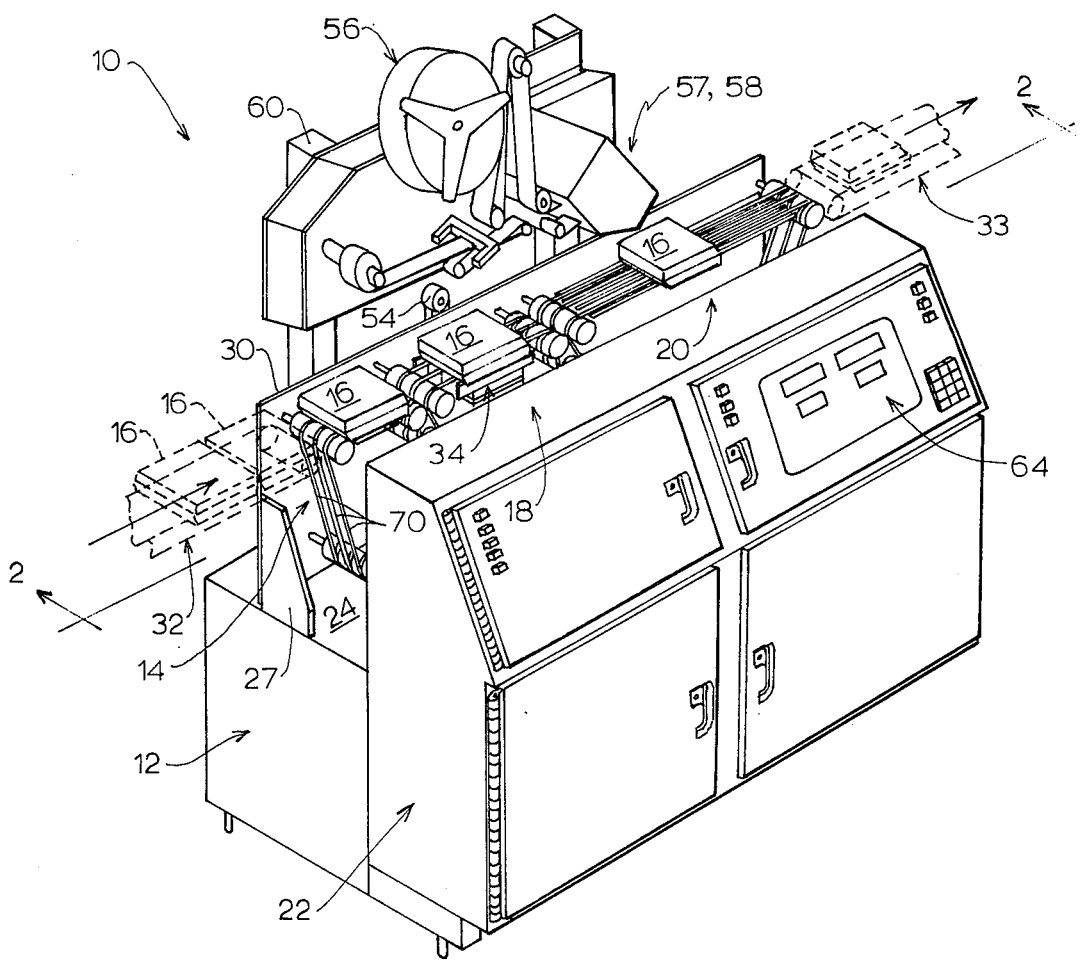
FIG. 1 is a perspective view of a machine formed in accordance with the preferred form of the present invention.

Reference is first made to FIG. 1, wherein a package weighing and labeling machine of the present invention is designated as 10 and shown as generally including a machine base 12; an endless conveyor 14, which is supported above the machine base and employed to transport packages 16 lengthwise thereof successively through package processing stations including a weighing station 18 and a package labeling station 20; and a control console 22, which is supported by and extends along the front of the machine base. For purposes of reference, machine base 12 is considered to include a horizontally disposed top plate 24; a weigher mounting standard 26, shown only in FIG. 4; and a pair of brackets 27 and 28, which upstand from opposite ends of the top plate and serve to support a conveyor mounting plate 30.

Any suitable means may be employed to feed packages 16 to and remove same from conveyor 14, as for instance endless belt type supply and discharge conveyors 32 and 33 shown only in FIG. 1. The term "package" as used herein is intended to be broadly construed as including for example a single article, plural associated articles, or a container in either an empty or filled condition.

Figure 4:
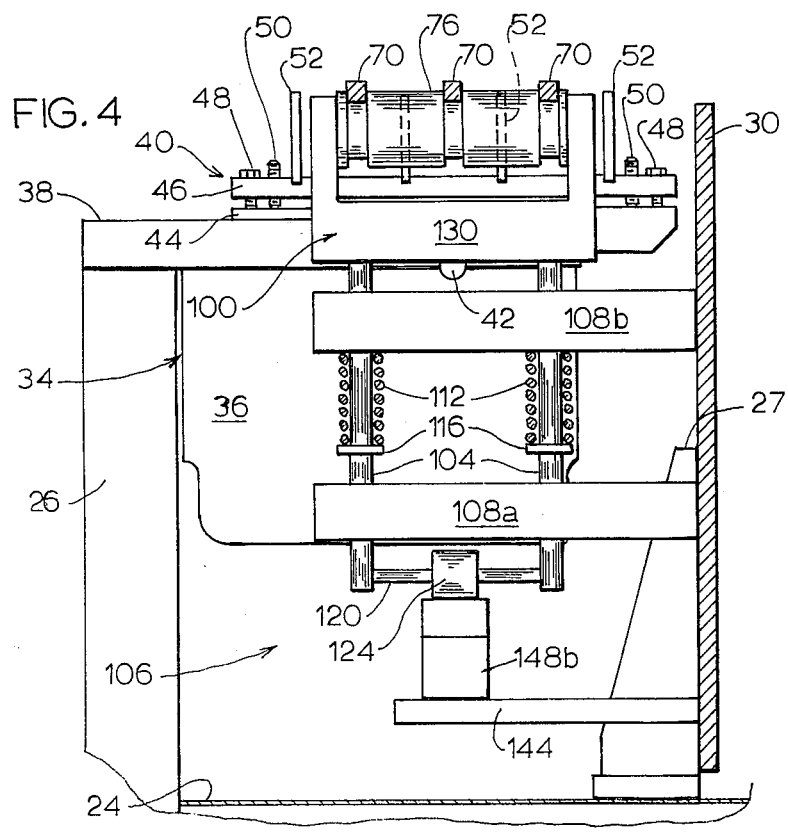
FIG. 4 is a sectional view taken generally along the line 4—4 in FIG. 2.

It will be understood by referring to FIGS. 1, 2 and 4 that weighing station 18 is provided with scale device or weigher 34 including a stationary housing 36, which is fixed to standard 26 by a mounting bracket 38, and a weighing or package processing platform 40, which is supported by a bar 42 extending horizontally outwardly through opposite side walls of housing 36 for vertical movement in response to the positioning thereon of the package to be weighed. The internal structure of scale device 34 to which bar 42 is attached may be conventional and forms no part of the present invention.

In the illustrated form of the invention, platform 40 includes a pair of lower bar or base members 44, which are supported one by each end of bar 42; a pair of upper bar members 46, which are adjustably supported one on each of lower bar members 44 by pairs of locking and adjusting screws 48 and 50, respectively; and a plurality of parallel, vertically upstanding rib or plate members 52, which extend between and are rigidly attached to upper bar members 46 and have coplanar upper edge surfaces 52a, which serve to support packages 16 during a weighing operation. The construction of platform 40 may depart from that illustrated in the drawings as required to handle packages of varying shape and/or size.

Weighing station 18 would also include an electric eye or other suitable sensor device 54 for sensing the presence of a package presented to the weighing station. Sensor device 54 would normally be arranged within the confines of the weighing station to indicate the proper positioning of a package by conveyor 14 over platform 40.

Labeling station 20 is shown for purposes of illustration as including a suitable label supply 56, a label printer 57 and label-applicator 58, which may be conveniently mounted on a pedestal 60 upstanding from the rear of top plate 24. The specific construction of the labeling station forms no part of the present invention.

Figure 7:
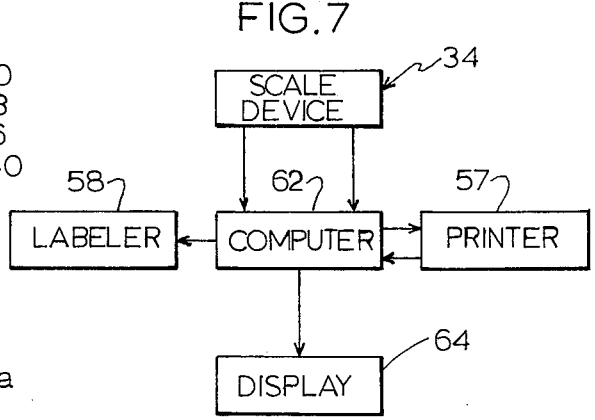
FIG. 7 is a block diagram of the control elements of the present machine.

A suitable computer designated generally as 62 in FIG. 7 and conveniently enclosed within console 22, is responsive to scale device 34 for controlling operation of labeling station 20 such that a label will be printed with any of the following: weight, price of a weighed package, and the price per pound; and such label immediately applied to the weighed package as it is passed through the labeling station. To insure weighing accuracy, the unladen or tare weight of platform 40 would be sensed before each weighing operation and the thus newly established tare gross weight employed in computing the weight of the next package to be weighed. Computer entries of package tare weight, package net weight, price per pound and package price may be presented for observation, as digital displays 64. The specific construction of computer 62 and the elements of labeling station may be conventional and form no part of the present invention.

Now referring to FIGS. 1–4, it will be seen that conveyor 14 is in the form of an endless belt type conveyor including a plurality of transversely spaced, endless belt elements 70, which are preferably in the form of endless chain elements, trained about a plurality of peripherally grooved guide or idler rollers 71–80 and a drive sprocket or roller 81 to define relatively aligned, package supporting infeed, intermediate and outfeed conveyor belt flights or conveyor portions 82, 84 and 86, respectively; non-package supporting infeed and outfeed conveyor belt loops or conveyor portions 88 and 90, which serve to connect the infeed and outfeed ends of intermediate flight 84 with infeed and outfeed flights 82 and 86, respectively; and a non-package supporting return or drive conveyor portion flight 92. As will be apparent from viewing FIG. 2, intermediate flight 84 is arranged to extend through weighing station 18, whereas outfeed flight 86 is arranged to extend below labeling station 20.

Conveyor belt elements 70 are normally simultaneously driven at an essentially constant, given package transport speed by sprocket 81, which is in turn connected to a suitable source of power including a chain or belt drive 94 and and electrical motor, not shown; tension in the conveyor belt elements being adjustably controlled, as required, by a suitable spring bias applied for example to guide roller 71.

In the illustrated construction, mounting plate 30 serves to cantilever support rollers 71–73 and 77–80, as well as sprocket 81, such that infeed and outfeed flights 82 and 86 are vertically fixed in horizontal alignment and disposed relatively above weighing platform 40. Elongated, generally U-shaped channel elements 96 and 98 may be also suitably supported by mounting plate 30 for the purpose of guiding and preventing undesired gravity and package weight induced vertical flexures of the belt elements of infeed and outfeed flights 82 and 86, respectively.

Figure 5:
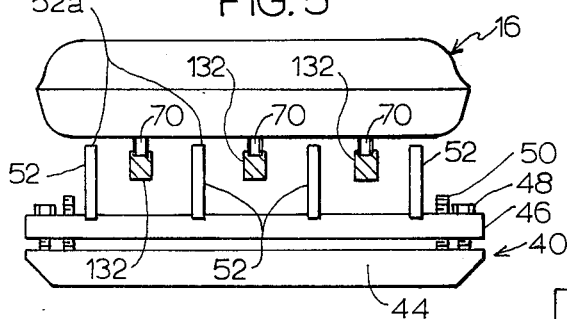
FIG. 5 is a sectional view taken generally along the line 5—5 in FIG. 2.
Figure 6:
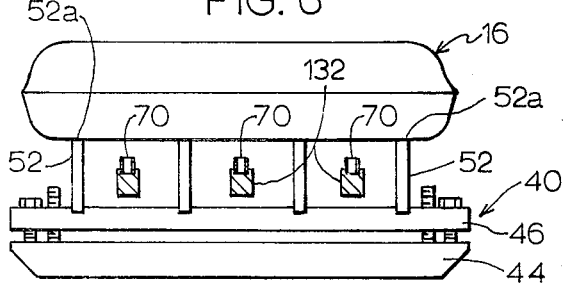
FIG. 6 is a sectional view similar to FIG. 5, but taken generally along the line 6—6 in FIG. 3.
Figure 3:
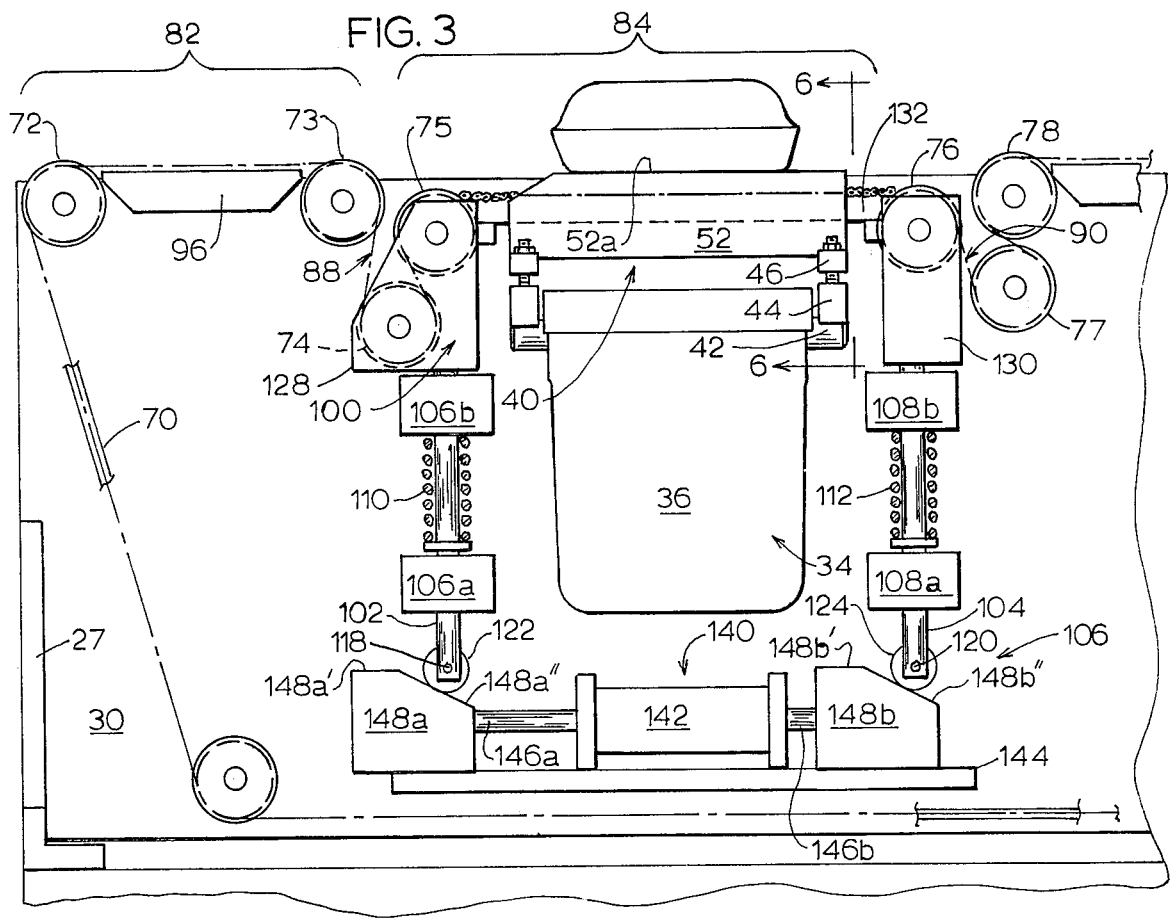
FIG. 3 is a sectional view similar to FIG. 2, but showing a package being weighed.

Rollers 74, 75 and 76 are end journaled on a frame 100, which is supported by pairs of guide rods 102 and 104 for vertical reciprocating movements relative to platform 40, whereby to move intermediate flight 84 vertically between an upper package receiving-discharge or transport position shown in FIGS. 2, 4 and 5, and a lower weighing position shown in FIGS. 3 and 6. Vertical movements of frame 100 are under the control of a pneumatically operated control mechanism 106, which in turn is controlled by computer 62 in response to a package present signal generated by sensor device 54 and a package weighing operation completion signal generated by scale device 34.

Referring to FIGS. 2 and 4, it will be understood that guide rods 102 and 104 slideably extend through vertically aligned guide openings, not shown, provided in mounting plate supported brackets 106a, 106b and 108a, 108b, respectively. Any suitable means, such as coil spring devices 110 and 112 disposed about rods 102 and 104 to end bear on brackets 106b and 108b and rod carried plates 114 and 116, respectively, may be employed to assist gravity in tending to drive frame 100 downwardly from its upper or transport position into its lower or weighing position, shown in FIGS. 2 and 3, respectively. The lower ends of each pair of guide rods 102 and 104 are interconnected by pin shafts 118 and 120, respectively, which serve to journal follower rollers 122 and 124, respectively.

Again referring to FIGS. 2 and 4, it will be seen that frame 100 includes generally U-shaped infeed and outfeed loop brackets 128 and 130, which are rigidly connected to the upper ends of guide rods 102 and 104, respectively and serve to end journal rollers 74, 75 and rollers 76, respectively. Brackets 128 and 130 are rigidly interconnected by elongated, generally U-shaped channel members 132, which additionally serve to guide and prevent undesired gravity and package weight induced flexures of belt elements 70 of intermediate flight 84 intermediate rollers 75 and 76.

Control mechanism 106 includes a pneumatic cylinder device 140 having a casing 142 rigidly fixed to a guide support plate 144, which is in turn cantilever supported by mounting plate 30. The piston rods 146a and 146b of cylinder device 140 are connected to like shaped and orientated cam blocks 148a and 148b. Cam blocks 148a and 148b are slideably supported on the upper surface of plate 144 and have their upper or cam surfaces positioned to provide continuous support for roller devices 122 and 124, respectively. The upper surfaces of guide blocks 148a and 148b include essentially horizontally disposed or first cam portions 148a' and 148b' and vertically inclined or second cam portions 148" and 148b". Means other than a pneumatic cylinder and cam arrangement may be employed to control vertical movements of frame 100 in the manner to be described.

In the package transport conditon of cylinder device 140 illustrated in FIG. 2, wherein piston rod 146b is fully extended and piston rod 136a is fully retracted, rollers 122 and 124 are disposed in engagement with horizontal cam portions 148a' and 148b', respectively; this serving to maintain frame 100 in its upper transport on non-processing position shown in FIG. 2 against the effects of gravity and the bias of springs 110 and 112. In this position of frame 100, conveyor elements 70 of intermediate flight 84 are arranged in essential horizontal alignment with the belt elements of infeed and outfeed flights 82 and 84, as best shown in FIG. 2, and are disposed vertically above the upper surfaces 52a of platform plate members 52, as best shown in FIG. 5, such that a package 16 may be fed into or discharged from weighing station 18 free from engagement with weighing platform 40. In the package weighing condition of cylinder device 140 illustrated in FIG. 4, wherein piston rod 146a is fully extended and piston rod 146b is fully retracted, rollers 122 and 124 are disposed in engagement with inclined cam portions 148a" and 148b"; the movement of the rollers downwardly along these inclined cam portions permitting lowering of frame 100 into its lower weighing or processing position. As frame 100 moves into its lower position, belt elements 70 of intermediate flight 84 are lowered into their weighing or processing position below surfaces 52a of platform flight members 52 and as this occurs a package to be weighed is lowered into supporting or resting engagement with surfaces 52a to initiate the package weighing operation.

By again referring to FIGS. 2 and 3, it will be understood that as frame 100 is lowered, the length of infeed loop 88, as measured between rollers 73 and 74 is increased as the length of outfeed loop 90, as measured between rollers 76 and 77, is correspondingly decreased. This concurrent lengthening and shortening of the infeed and outfeed belt loop portions serves to decelerate or reduce the speed of intermediate belt flight 84 relative to both frame 100 and scale platform 40 to a value less than the given conveyor transport speed. The rate at which the intermediate belt flight and thus a package carried thereby is decelerated relative to platform 40 will be proportional to the rate of fall or downward movement of frame 100, this in turn being determined by the speed of operation of control mechanism 106.

As intermediate flight 84 reaches its weighing position after depositing the package to be weighed on platform 40, change in length of the infeed and outfeed loops ceases to occur, and thus the speed of the intermediate flight relative to platform 40 returns to its initial or given transport speed.

After a weighing operation has been completed, cylinder device 140 is returned to its initial or package transport condition described above. As this occurs the belt elements of intermediate conveyor 84 initially lift the weighed package from platform 40 and finally return same to its initial or infeed elevation for discharge onto outfeed flight 86. It is important to note that as frame 100 is raised, the length of infeed loop 88 is decreased as the length of outfeed loop 90 is correspondingly increased. This concurrent shortening and lengthening of the infeed and outfeed loops serves to accelerate or increase the speed of intermediate belt flight 84 relative to both frame 100 and scale platform 40 to a valve in excess of the given transport speed. The rate of change in speed is proportional to the rate of rise of frame 100, which in turn is determined by the speed of operation of control mechanism 106. As intermediate flight 84 reaches its initial or receiving-discharge position, the change in length of the infeed and outfeed loops ceases to occur, and thus the speed of the intermediate flight relative to platform 40 returns to its initial or given transport speed.

By employing intermediate flight 84 to decelerate the package to be weighed before it is placed in supporting or resting engagement with weighing platform 40, the speed at which packages are presented to weighing station 18 may be substantially increased without subjecting the weighing platform to a corresponding time consuming increase in vibrational influences or causing misplacement or misalignment of the package on the weighing platform. On the other hand, by causing intermediate flight 40 to travel relative to the weighing platform and thus the stationary weighed package at a higher rate of speed than the overall conveyor speed, as the intermediate flight is returned to its receiving-discharge position, inertia of the weighed package may be more easily overcome and it is presented for discharge onto outfeed flight 86 within a shorter period of time than would otherwise be possible.

The construction of the conveyor system of the preferred form of the present invention is relatively simple, since a single endless conveyor defines all of the package supporting flights and a single remotely placed power source may be employed simultaneously to drive all such flights at a constant speed.

Further, it will be understood that the relatively high transport speed of conveyor 14 permits required spacing of packages passing through machine 10 to be achieved without the use of an escapement for controlling discharge of such packages from a source of end-to-end or abutting packages, such as would be provided by supply conveyor 32 having a relatively lower transport speed. For the specific form of the invention disclosed, differences between transport speeds of conveyor 14 and supply conveyor 32 will be on the order of between 2 and 2½ to 1.

While the specifically disclosed form of conveyor 14 is preferred from the standpoint of simplicity of machine construction and control, it is anticipated that the basic concept of employing a vertically displaceable, variable speed conveyor section in the weighing station initially to decrease the speed of a package to be weighed prior to its engagement with a weighing platform and subsequently to assist in overcoming the inertia of a stationary weighed package, may be employed in other weighing machines. As by way of example, it is contemplated that one or both of infeed flight 82 and outfeed flight 86 may be replaced by other conveyor devices, including chutes, which are separate from the intermediate and drive flights and loop portions of the conveyor.

As previously indicated, it is also contemplated that the described conveyor system possesses utility in association with mechanisms other than weighing and labeling machines. Specifically, the present conveyor system possesses utility in any environment requiring a package, article or the like to be brought to rest on a platform, fixture or the like at one or more processing stations arranged along a high speed conveyor run without changing the speed at which the conveyor is driven. In view of the general utility of the present conveyor system, the generic term "processing" is used in the appended claims to include any operation or process performed on a package, article or other object incident to its being brought to rest on a platform by operation of the present conveyor system including as by way of example, weighing, inspection, testing, treatment and part assembly.

We claim:

1. An apparatus for processing a package presented to a processing station at a given transport speed, which comprises:

processing means arranged within said processing station and including a platform on which said package is to be positioned during processing thereof and processing apparatus to effect said processing;

continuously driven conveying means for transporting said package to and from said processing station at a given transport speed and having a portion above said platform movable between package receiving-discharge and processing positions disposed above and below said platform, respectively;

actuator means connected with said portion of the conveying means for lowering said portion to said processing position while transiently decelerating the speed of said portion to a value less than said given transport speed and for raising said portion to said receiving-discharge position while transiently accelerating the speed of said portion to a value greater than said given transport speed, whereby each package is decelerated and deposited transiently on said platform whereafter the deposited package is lifted from the platform and accelerated by said portion; and control means connected with said actuator means and said processing apparatus for causing said actuator means to cycle through the lowering and raising of said portion of the conveyor means and for causing the processing apparatus to effect said processing while a package is deposited on said platform.

2. Apparatus as defined in claim 1 wherein said platform is a movable scale platform and said processing apparatus includes weighing means responsive to movement of said scale platform and a computer connected to said weighing means.

3. An apparatus for processing a package presented to a processing station at a given transport speed, which comprises:

processing means arranged within said processing station and including a platform on which said package is to be positioned during processing thereof and processing apparatus to effect said processing;

endless belt conveying means having a package supporting portion extending essentially horizontally through said processing station and a non-supporting portion, said package supporting portion being vertically displaceable between package receiving-discharge and package processing positions disposed vertically above and below said platform, respectively;

drive means associated with said non-supporting portion for driving said conveyor means at an essentially constant conveyor speed corresponding to said transport speed;

actuator means connected with said package supporting protion for lowering said package supporting portion to said processing position while transiently decelerating the speed of such portion to a value less than said constant conveyor speed and for raising said package supporting portion to said receiving-discharge position while transiently accelerating the speed of such portion to a value greater than said constant conveyor speed, whereby each package is decelerated and deposited transiently on said platform whereafter the deposited package is lifted from the platform and accelerated by said package supporting portion; and control means connected with said actuator means and said processing apparatus for causing the actuator means to cycle through the lowering and raising of said package supporting portion and for causing the processing apparatus to effect said processing while a package is deposited on said platform.

4. Apparatus as defined in claim 3 wherein said platform is a movable scale platform and said processing apparatus includes weighing means responsive to movement of said scale platform and a computer connected to said weighing means.

5. An apparatus according to claim 3 wherein said endless belt conveying means includes non-package supporting conveyor loop portions of said conveyor arranged adjacent opposite ends of said package supporting portion, said actuator means causing said loop portions to undergo equal and opposite changes in length during lowering and raising movements of said package supporting portion, and said drive means is associated with a portion of said non-supporting portion other than said loop portions.

6. An apparatus for processing a package comprising in combination:

a package conveyor including endless belt means trained about a plurality of guide rollers to define an intermediate package supporting conveyor belt flight end connected to infeed and outfeed package supporting conveyor belt flights by non-package supporting inlet and outlet belt loop portions, respectively, and a return belt flight opposite end connected to said infeed and outfeed belt flights;

drive means associated with one of said belt flights other than said intermediate belt flight for driving said belt means at a given package transport speed;

processing means including a processing platform on which said package is to be positioned during processing thereof and processing apparatus for effecting said processing, said platform being arranged in vertical alignment with said intermediate belt flight;

a frame for mounting certain of said guide rollers adjacent opposite ends of said intermediate belt flight, said frame being vertically movable to effect movement of said certain guide rollers and thus said intermediate belt flight between package receiving-discharge and processing positions, said intermediate belt flight when in said receiving-discharge position being disposed relatively above said platform and arranged in essentially horizontal alignment with said infeed and outfeed belt flights and when in said processing position being disposed relatively below said platform, said infeed and outfeed belt loops being concurrently lengthened and shortened, respectively, during downward movement of said intermediate belt flight from said receiving-discharge position into said processing position, thereby to decrease the speed of said intermediate belt flight relative to said platform to a value below said transport speed during said downward movement, and said infeed and outfeed belt loops being concurrently shortened and lengthened, respectively, during upward movement of said intermediate belt flight from said processing position into said receiving-discharge position, thereby to increase the speed of said intermediate belt flight relative to said platform to a value above said transport speed during said upward movement;

control means connected with said actuator means and said processing apparatus and responsive to positioning of said package on said intermediate belt flight when in said receiving-discharge position for causing said actuator means to execute a cycle and for causing said processing apparatus to effect processing while a package is deposited on said platform.

7. An apparatus according to claim 6, wherein said frame is supported for vertical reciprocating movement by vertically extending rods carrying cam followers adjacent lower ends thereof, and said actuator means includes horizontally movable cam members engageable with said cam followers to effect vertical movements of said rods.

8. Apparatus as defined in claim 6 wherein said platform is a movable scale platform and said processing apparatus includes weighing means responsive to movement of said scale platform and a computer connected to said weighing means.

9. The method of processing articles at a processing station which comprises the steps of:

a. effecting constant speed movement of a succession of articles along a horizontal path to and from a processing station; and b. sensing the presence of each article as it moves to the processing station and effecting a cycle of operations in response thereto, said cycle of operations comprising:

1. lowering an article with respect to said path while decelerating its speed to a value less than said constant speed and depositing the article in resting position on a platform during the decelerating operation,
2. effecting processing of the article while it is in its position of rest on the platform,
3. raising the article from its position of rest on the platform while accelerating its speed back to said constant speed.

* * * * *